(12) United States Patent
Kang et al.

(10) Patent No.: US 8,399,558 B2
(45) Date of Patent: Mar. 19, 2013

(54) INORGANIC-ORGANIC HYBRID COMPOSITION AND USE THEREOF

(75) Inventors: Eui-chul Kang, Tsukuba (JP); Atsuhiko Ogura, Tsukuba (JP); Shingo Kataoka, Tsukuba (JP); Kenji Ito, Tsukuba (JP)

(73) Assignee: NOF Corporation, Tokyo (JP)

( * ) Notice: Subject to any disclaimer, the term of this patent is extended or adjusted under 35 U.S.C. 154(b) by 651 days.

(21) Appl. No.: 12/305,543

(22) PCT Filed: Jun. 19, 2007

(86) PCT No.: PCT/JP2007/062304
§ 371 (c)(1),
(2), (4) Date: Apr. 22, 2009

(87) PCT Pub. No.: WO2007/148684
PCT Pub. Date: Dec. 27, 2007

(65) Prior Publication Data
US 2009/0208719 A1    Aug. 20, 2009

(30) Foreign Application Priority Data

| Jun. 20, 2006 | (JP) | ................................ | 2006-169992 |
| Jun. 20, 2006 | (JP) | ................................ | 2006-169993 |
| Oct. 26, 2006 | (JP) | ................................ | 2006-291401 |
| Oct. 26, 2006 | (JP) | ................................ | 2006-291402 |

(51) Int. Cl.
*C08F 136/00* (2006.01)
*C08F 8/42* (2006.01)
*C08F 8/40* (2006.01)

(52) U.S. Cl. ............................ 524/560; 524/543; 525/55

(58) Field of Classification Search .................. 524/543, 524/555, 560; 525/55
See application file for complete search history.

(56) References Cited

U.S. PATENT DOCUMENTS 6,183,935 B1 * 2/2001 Hanabata et al. ........... 430/270.1
7,374,863 B2 * 5/2008 Sugasaki et al. ........... 430/284.1

FOREIGN PATENT DOCUMENTS

| CN | 1399535 A | 2/2003 |
| CN | 1651512 A | 8/2005 |
| CN | 1765880 A | 5/2006 |
| EP | 1 652 838 A1 | 5/2006 |
| EP | 1 779 897 A2 | 5/2007 |
| JP | 53-111336 A | 9/1978 |
| JP | 56-000862 A | 1/1981 |
| JP | 56-104972 A | 8/1981 |

(Continued)

OTHER PUBLICATIONS

JP 2005113029 A, Apr. 2005, Derwent Ab.*

(Continued)

*Primary Examiner* — Satya Sastri
(74) *Attorney, Agent, or Firm* — Sughrue Mion, PLLC (57) ABSTRACT

The present disclosure provides an inorganic-organic hybrid film which is excellent in transparency, adhesion, heat resistance, weatherability, and anti-rust property, whose refractive index may be controlled easily, and which is also excellent in hardness. Also provided are an inorganic-organic hybrid composition as a starting material for the film, and a hard coating material, an optical material, an anti-rust coating material, and a conductive coating material, all utilizing the composition. The composition is characterized by containing organic component (A) composed of monomer component (a1) containing a particular diol (meth)acrylate compound (U) having a urethane bond, or polymer component (a2) containing polymer (P) obtained by polymerization of monomer component (a1), and inorganic component (B), wherein the ratio of the organic component (A) to the inorganic component (B) is 1:99 to 99:1 by mass.

15 Claims, 2 Drawing Sheets

FOREIGN PATENT DOCUMENTS

| | | |
|---|---|---|
| JP | 57-080460 A | 5/1982 |
| JP | 59-068377 A | 4/1984 |
| JP | 60-079071 A | 5/1985 |
| JP | 06-136321 A | 5/1994 |
| JP | 08-283661 A | 10/1996 |
| JP | 09-291131 A | 11/1997 |
| JP | 2000-017198 A | 1/2000 |
| JP | 2000-119525 A | 4/2000 |
| JP | 2001-064782 A | 3/2001 |
| JP | 2001-105528 A | 4/2001 |
| JP | 2001-131763 A | 5/2001 |
| JP | 2003-201444 A | 7/2003 |
| JP | 2004-027330 A | 1/2004 |
| JP | 2004-232082 A | 8/2004 |
| JP | 2004-232083 A | 8/2004 |
| JP | 2005113029 A * | 4/2005 |
| JP | 2005-146243 A | 6/2005 |
| JP | 2005-250438 A | 9/2005 |
| JP | 2006-051781 A | 2/2006 |
| JP | 2006-063358 A | 3/2006 |
| JP | 2006-151953 A | 6/2006 |

OTHER PUBLICATIONS

Shingo Katayama, et al., "Processing of transparent inorganic / organic hybrids using metal alkoxides and polydimethylsiloxane", Proc. SPIE, 1997, pp. 134-142, vol. 3136 (Sol-Gel Optics IV).

* cited by examiner

INORGANIC-ORGANIC HYBRID COMPOSITION AND USE THEREOF

CROSS REFERENCE TO RELATED APPLICATION

This application is a National Stage of International Application No. PCT/JP2007/062304 filed Jun. 19, 2007, claiming priority based on Japanese Patent Application Nos. 2006-169992, filed Jun. 20, 2006, 2006-169993 filed Jun. 20, 2006, 2006-291401 filed Oct. 26, 2006 and 2006-291402 filed Oct. 26, 2006, the contents of all of which are incorporated herein by reference in their entirety.

FIELD OF ART

The present invention relates to an inorganic-organic hybrid material. In particular, the present invention relates to an inorganic-organic hybrid composition, a film produced by curing the composition, and use thereof, which composition contains an organic component utilizing a diol (meth)acrylate compound having a urethane bond and an inorganic component, and which may be used in various fields, such as hard coating, paint, ink, coating materials, film materials, adhesive materials, optical materials, anti-rust coating materials, and conductive coating materials. Such inorganic-organic hybrid materials are expected to be applicable in a wide variety of fields, such as optics, machinery, chemistry, electronics and electricity, and living bodies.

BACKGROUND ART

Inorganic-organic hybrid materials are, in general, composites of the same or different kinds of materials, and include those referred to as blended materials, composites, microcomposites, nanocomposites, hybrids, microhybrids, nanohybrids, nanocomposite materials, molecular composites, molecular composite materials, and the like. A variety of such materials from those merely mixed to those bound at the nano-level, or even the molecular or atomic level, are being developed.

Recently, the structure or construction of the materials, i.e., voids inside the materials, such as micropores or mesopores, is controlled in addition to the composition of the organic and inorganic materials, to regulate various properties, such as mechanical strength, optical properties, solvent resistance, water resistance, gas permeability, gas absorption/desorption, refractive index, dielectricity, magnetism, fluorescence, electrical conductivity, biocompatibility, hydrophilicity/hydrophobicity, anticlouding property, and anti-rust property, as well as characteristics, such as moldability and processability, by compositing various materials. This results in development of materials exhibiting diversified functions.

Many of the inorganic-organic hybrid materials with a matrix of an organic polymer, wherein the inorganic component is uniformly dispersed in the organic polymer, are intended to provide improved kinetic properties, heat resistance, and the like properties, while characteristics of the organic polymer are conserved, such as moldability, light weight, corrosion resistance, and durability. The organic polymer may be polyamide, polystyrene, polypropylene, acrylic resins, epoxy resins, or the like. On the other hand, as the inorganic component, alkoxysilanes, layered clay minerals, metal oxides, fine metal particles, or the like are taken into consideration. Recently, new materials, such as fullerene and carbon nanotubes, are also considered for application as the inorganic component.

Many of the inorganic-organic hybrid materials with a matrix of an inorganic component, wherein organic molecules are carried on or bound to a matrix of a metal oxide obtained by a sol-gel method, are intended to improve the properties of the metal oxide, such as brittleness, transmittance, and optical characteristics, while the properties of the organic molecules are expressed. In such materials, organic molecules or low molecular weight oligomers are confined in an inorganic component matrix usually by means of relatively weak bonds, such as van der Waals force or hydrogen bonds.

Recent studies further go into preparation of inorganic-organic hybrid materials followed by removal of the organic component, to thereby control the configuration of the inorganic material, i.e., to make it porous or to regulate its pore size, or preparation of materials having unique structures, configurations, or mesoporosity using organic molecules as a mold.

As inorganic-organic hybrid materials having characteristic structures, there are proposed materials having various organic molecules intercalated between the layers of an inorganic layered material, such as graphite, clay minerals, swelling layered silicate, montmorillonite, transition metal chalcogen compounds, or zirconium phosphate. Studies are being made for improving the properties of these materials, such as photoelectric or catalytic functions, by means of the functional organic molecules carried between the layers of the inorganic layered material. Further, so called functionally graded materials are also studied, wherein the properties of the material are controlled inside by adjusting the ratio of the organic to inorganic components inside the material.

Common synthetic resins, such as acrylic, polycarbonate, and PET resins, are widely used in various fields including the IT field for their various excellent properties, such as transparency and shapability, but have problems in durability due to their insufficient surface hardness and heat resistance. In order to overcome this drawback, the synthetic resins are usually treated on the surface for improving the wear resistance. Typically, an inorganic or organic coating composition is applied on the surface of the synthetic resin and cured to form a film having good wear resistance.

As such a coating composition, Patent Publications 1 to 5 disclose compositions containing a hydrolytic condensate of organoalkoxysilane, colloidal silica, and other compounds, and Patent Publication 6 discloses a composition containing a hydrolytic condensate of tetraalkoxysilane and organotrialkoxysilane, and colloidal silica. Further, as a coating composition with improved adhesion, Patent Publication 7 proposes a composition composed of organotrihydroxysilane, colloidal silica, a polysiloxane-polyether copolymer, aliphatic alcohol, and a plurality of water-miscible polar solvents capable of eroding plastics, and Patent Publication 8 proposes a composition composed of organotrihydroxysilane essentially containing phenyltrihydroxysilane, colloidal silica, and a solid adjusting agent.

These coating compositions provide good durability when formed into a coating film on glass. However, when these coating compositions are formed into a film on a synthetic resin, in particular, with the content of colloidal silica in the coating composition being increased, or with tetrafunctional alkoxysilane being added for improving the wear-resistance, the resulting coating film may be cracked or peeled off the synthetic resin substrate in durability tests such as humidity resistance test, thermal shock test, outdoor exposure, and accelerated exposure in a sunshine weather meter.

Patent Publication 9 proposes a method for producing an inorganic-organic hybrid using polyurethane with hydrophilic soft segment, hydrolysable alkoxysilane, and optionally alcohol sol containing a catalyst dissolved in lower alcohol. Patent Publication 10 proposes a method for producing an inorganic-organic hybrid material by reacting a metal alkoxysilane having an isocyanate group with a polyol having a hydroxyl group at both terminals, and then with alkoxytitanium by sol-gel method.

Patent Publication 11 proposes a composite material composition containing, as a binder, a hydrolysate of mixed silane compounds containing an alkoxysilane having an alkyl group and an alkoxysilane having an epoxy group, combined with a short fiber inorganic filler or an organic filler, for improving weatherability, flexibility, wear resistance, heat resistance, or the like properties. Patent Publication 12 proposes a method for producing a resin composite material by forming, on the surface of a synthetic resin, a polyimide precursor layer using inorganic powder particles, such as of ceramics, metals, or glass, and polyamidic acid.

However, the inorganic-organic hybrids obtained by these prior art methods do not necessarily have sufficient film hardness, transparency, adhesion, or weatherability. Thus, development of inorganic-organic hybrid materials which solve these problems, are demanded.

Particularly in the art of optical materials, inorganic-organic hybrid materials are required to have: (1) adjustability of the refractive index over a wide range, (2) light transmittance over a wide wavelength range, (3) lighter weight compared to inorganic optical materials, (4) better heat resistance and stability compared to organic materials, and (5) better flexibility compared to inorganic optical materials. Thus, development of inorganic-organic hybrid materials having such properties is also desired.

In such inorganic-organic hybrid materials, it is important to control translucency and refractive index as basic properties. Specifically, the refractive index of an inorganic-organic hybrid material is controlled by introducing an inorganic component other than Si, i.e., Al, Ti, Zr, or the like, into the system to increase the refractive index by means of high electronic polarization of a metal element (see Non-patent Publication 1). Further, it is known that, in a transparent inorganic-organic hybrid material, the refractive index linearly increases with the increase in the content of the inorganic component in the Lorentz-Lorenz relationship.

In conventional inorganic-organic hybrid materials, the refractive index of an organic component was increased by adding an inorganic component, i.e., the refractive index was controlled by the content of the inorganic component. Since the refractive index increases proportionally to the increase in the amount of the inorganic component added, an increased content of the inorganic component is required for higher refractive index. However, it was hard to achieve a high refractive index with the characteristics of the organic substance being conserved, such as flexibility, transparency, and adhesion.

Zinc plating and zinc alloy plating are generally used for preventing rusting on iron materials or parts used in vehicles or building material products. However, the zinc-plated iron materials and parts, when used intact, easily gather white rust, which is zinc rust, so that an additional protective film should be formed thereon. Such a protective film is usually formed by chromating, which produces a chromate film of practical corrosion resistance easily at low cost. However, since chromating requires harmful sexivalent chromium, not only the treatment liquid, but also the sexivalent chromium eluted from the treatment liquid may have adverse effects on human body or on environment.

In view of this, a number of so called chromium-free treatment techniques have been proposed for preventing formation of white rust on zinc-based-plated steel sheets without chromating.

For example, Patent Publication 13 discloses a method of forming on the surface of a zinc-based-plated steel sheet a first layer of a zinc phosphate treatment film containing at least one element selected from the group consisting of Ni, Mn, and Mg at a coating mass of 0.2 to 2.5 g/cm$^2$, and forming thereon an organic film mainly composed of at least one organic resin selected from the group consisting of ethylene, epoxy, urethane, and acrylic resins. However, the film obtained by this method does not have high corrosion resistance comparable to that provided by chromating.

Patent Publications 14 to 17 disclose methods of forming on the surface of a zinc-based-plated steel sheet a first layer of a zinc phosphate film containing Mg, and a second layer of an organic-inorganic composite film composed of an epoxy resin and powder or colloid of $SiO_2$, $Al_2O_3$, $ZrO_2$, or the like. The film obtained by this method has certain corrosion resistance. However, the method involves formation of two layers of the zinc phosphate film and the organic-inorganic composite film, and the steps such as rinsing and drying of the first layer before formation of the second layer, which is complex.

Patent Publications 18 and 19 disclose methods of forming a ceramics coating layer on the surface of a zinc-based-plated steel sheet by applying and drying a sol solution of an alkoxide of Si, Ti, or Al that has been prepared in the acidic or alkaline region. The film obtained by this method has certain corrosion resistance. However, the adhesion to the substrate and the flexibility of the ceramics coating film per se made from the alkoxide is not necessarily sufficient. Thus, when small vehicle parts, such as bolts, nuts, and hose clamps, are treated by these methods, cracks may form disadvantageously.

The conventionally proposed anti-rust coating materials discussed above hardly meet the requirements for an anti-rusting agent for zinc-plated steel sheets that may replace the conventional chromating, with respect to corrosion resistance, production process, and the like. Thus, there is a demand for development of a chromium-free anti-rust coating material which is capable of forming an anti-rust film not only excellent in corrosion resistance, but also excellent in adhesion to the substrate, film hardness, and flexibility.

Incidentally, Patent Publication 20 proposes a diol (meth) acrylate compound having a urethane bond. However, usefulness of this compound in an inorganic-organic hybrid material is not known.

Patent Publication 1: JP-53-111336-A
Patent Publication 2: JP-56-104972-A
Patent Publication 3: JP-57-80460-A
Patent Publication 4: JP-57-80460-A
Patent Publication 5: JP-59-68377-A
Patent Publication 6: JP-8-283661-A
Patent Publication 7: JP-56-862-A
Patent Publication 8: JP-60-79071-A
Patent Publication 9: JP-6-136321-A
Patent Publication 10: JP-9-291131-A
Patent Publication 11: JP-2000-119525-A
Patent Publication 12: JP-2005-146243-A
Patent Publication 13: JP-2001-105528-A
Patent Publication 14: JP-2001-131763-A
Patent Publication 15: JP-2004-27330-A
Patent Publication 16: JP-2004-232082-A
Patent Publication 17: JP-2004-232083-A
Patent Publication 18: JP-2001-64782-A

Patent Publication 19: JP-2006-63358-A
Patent Publication 20: JP-2006-151953-A
Non-Patent Publication 1: Proc. SPIE Vol. 3136 (Sol-Gel Optics IV), p 134-142 (1997)

SUMMARY OF THE INVENTION

It is an object of the present invention to provide an inorganic-organic hybrid film which is excellent in transparency, adhesion, heat resistance, weatherability, and anti-rust property, wherein these characteristics are well balanced even at a higher content of the inorganic component, wherein the inorganic component may be contained at a high content, and accordingly the refractive index in particular may be controlled easily, and which is excellent in hardness, as well as an inorganic-organic hybrid composition as a starting material for the film, a hard coating material, an optical material, an anti-rust coating material, and a conductive coating material, all utilizing the composition.

According to the present invention, there is provided an inorganic-organic hybrid composition comprising:

an organic component (A) consisting of a monomer component (a1) containing a diol (meth)acrylate compound (U) having a urethane bond represented by the formula (1) or a polymer component (a2) containing a polymer (P) obtained by polymerization of said monomer component (a1) and having a structural unit derived from said compound (U):

(1)

wherein $R^1$ stands for a hydrogen atom or a methyl group and $R^2$ stands for $-(CH_2)_n-$ with n being an integer of 1 to 4, and an inorganic component (B), wherein a ratio of said organic component (A) to said inorganic component (B) is 1:99 to 99:1 by mass.

According to the present invention, there is also provided an inorganic-organic hybrid film produced by curing the above composition into a film.

According to the present invention, there is further provided a hard coating material, an optical material, an anti-rust coating material, or a conductive coating material, each consisting of the above composition.

According to the present invention, there is further provided use of the above inorganic-organic hybrid composition in the manufacture of an optical material, an anti-rust coating material, or a conductive coating material.

Since the inorganic-organic hybrid composition of the present invention contains the organic component (A) utilizing the compound (U) represented by the formula (1), the content of the inorganic component (B) may be adjusted over a wide range, and a hybrid material with its components uniformly dispersed may be obtained. The composition of the present invention may suitably be used as a material or a binder component in a variety of fields, such as high performance paints, ink, coating materials, hard coating, films, adhesives, optical materials, anti-rust coating materials, and conductive coating materials.

Containing the organic component (A) and the inorganic component (B) with excellent homogeneity, the inorganic-organic hybrid film of the present invention has excellent transparency, adhesion, heat resistance, weatherability, anti-rust property, and film strength, and its refractive index may be controlled over a wide range.

PREFERRED EMBODIMENTS OF THE INVENTION

The present invention will now be explained in detail.

The inorganic-organic hybrid composition according to the present invention contains organic component (A), which is composed of monomer component (a1) containing compound (U) represented by the formula (I), or of polymer component (a2) containing polymer (P) obtained by polymerization of the monomer component (a1) and having a structural unit derived from the compound (U).

The compound (U) is a diol (meth)acrylate compound having a urethane bond represented by the formula (1). In the formula (1), $R^1$ stands for a hydrogen atom or a methyl group, with a hydrogen atom being preferred for its high polymerizability. $R^2$ stands for $-(CH_2)_n-$, with n being an integer of 1 to 4. Specifically, $R^2$ is $-CH_2-$, $-CH_2CH_2-$, $-CH_2CH_2CH_2-$, or $-CH_2CH_2CH_2CH_2-$, with $-CH_2-$ and $-CH_2CH_2-$ being preferred for their availability.

Examples of the compound (U) may include glycerol-1-methacryloyloxyethyl urethane and glycerol-1-acryloyloxyethyl urethane, with glycerol-1-methacryloyloxyethyl urethane being preferred for its readiness of synthesis.

The compound (U) may be prepared, for example, by subjecting a cyclic ketal represented by the formula (2) and a (meth) acryloyloxyethyl isocyanate represented by the formula (3) to urethane reaction to obtain a compound represented by the formula (4), and subjecting the compound to hydrolytic ring-opening reaction in a water-containing solvent in the presence of a catalyst.

(2)

In the formulae, $R^1$ stands for a hydrogen atom or a methyl group, $R^2$ stands for —$(CH_2)n$- with n being an integer of 1 to 4, and $R^3$ and $R^4$ may be the same or different and each stands for a hydrogen atom, a methyl group, or an ethyl group.

Examples of the cyclic ketal represented by the formula (2) may include (R,S)-1,2-isopropylideneglycerol and (R,S)-sec-butylideneglycerol, with (R,S)-1,2-isopropylideneglycerol being preferred for its readiness of reaction. The cyclic ketal may be a commercial product, or a synthesized product obtained by subjecting glycerine and a carbonyl compound represented by the formula (5) to ring opening reaction in a solvent, such as petroleum ether, benzene, or toluene, in the presence of a catalyst, such as hydrochloric acid, sulfuric acid, or para-toluenesulfonic acid.

In the formula, $R^3$ and $R^4$ may be the same or different, and each stands for a hydrogen atom, a methyl group, or an ethyl group.

Examples of the carbonyl compound represented by the formula (5) may include formaldehyde, acetoaldehyde, acetone, methyl ethyl ketone, and 3-pentanone, with acetone being preferred for its easiness of removal after the reaction.

Examples of the (meth)acryloyloxyethyl isocyanate represented by the formula (3) may include methacryloyloxyethyl isocyanate and acryloyloxyethyl isocyanate, with methacryloyloxyethyl isocyanate being preferred for its availability. Such isocyanate may be a commercial product, or synthesized from known materials by means of commonly known synthesis methods.

Examples of the compound represented by the formula (4) may include (R,S)-1,2-isopropylideneglycerol-3-methacryloyloxyethyl urethane and (R,S)-sec-butylideneglycerol-3-methacryloyloxyethyl urethane, with (R,S)-1,2-isopropylideneglycerol-3-methacryloyloxyethyl urethane being preferred for good volatility of its leaving group during the hydrolytic ring-opening reaction.

In the urethane reaction between the cyclic ketal represented by the formula (2) and the (meth)acryloyloxyethyl isocyanate represented by the formula (3), the amount of the cyclic ketal may preferably be 1.1 to 3 times by molar ratio of the amount of the isocyanate. This urethane reaction may proceed without a catalyst, but for shortening the reaction time, use of a catalyst may be preferred.

Examples of the catalyst may include tertiary amine compounds, such as N-methylmorpholine, N-ethylmorpholine, dimorpholinomethane, ethyl morpholinoacetate, N-(3-dimethylaminopropyl)morpholine, N-methylpiperidine, quinoline, 1,2-dimethylimidazole, N-methyldicyclohexylamine, triethylamine, pyridine, 1,4-diazabicyclooctane, tetramethyl-1,3-butanediamine, tetramethyl-1,3-propanediamine, dimethyldiethyl-1,3-propanediamine, pentamethyldiethylenediamine, tetraethylmethanediamine, bis(2-dimethylaminoethyl)adipate, bis(2-diethylaminoethyl)adipate, dimethylcyclohexylamine, diethylcyclohexylamine, methyloctylcyclohexylamine, and methyldodecylcyclohexylamine; and tin-containing compounds, such as tin chloride, tetra-n-butyltin, tetraphenyltin, tri-n-butyltin acetate, dimethyldichlorotin, di-n-butyltin diacetate, di-n-butyldichlorotin, di-n-butyltin dilaurate, di-n-butyltin dilaurylmercaptide, bis(2-ethylhexyl)tin oxide, and di-n-butyltin sulfide. Tertiary amine compounds are preferred since these compounds are safer even when they are contained in the reaction product as a residual catalyst.

The amount of the catalyst, when used, is usually 0.001 to 50 parts by mass, preferably 0.01 to 30 parts by mass, most preferably 0.1 to 10 parts by mass, based on 100 parts by mass of (meth)acryloyloxyethyl isocyanate.

No problem will arise even if the urethane reaction is performed without a solvent, or the reaction may alternatively be performed in the presence of a solvent, if the solvent is not reactive to (meth)acryloyloxyethyl isocyanate. Examples of such a solvent may include acetone, methyl ethyl ketone, acetonitrile, chloroform, carbon tetrachloride, dichloromethane, benzene, toluene, hexane, and pyridine, with acetone being the most preferred for its easiness of removal after the reaction.

The amount of the solvent, when used, is about 0.1 to 1000 parts by mass, based on 100 parts by mass of (meth)acryloyloxyethyl isocyanate.

The temperature for the urethane reaction is usually 0 to 100° C., preferably 25 to 80° C., most preferably 40 to 60° C. If the reaction temperature is lower than 0° C., the reaction may require a prolonged period of time to complete. If the reaction temperature is higher than 100° C., side reactions, such as polymerization, are likely to occur. The reaction time may vary depending on the reaction temperature, the kind and amount of a catalyst, and a preferred reaction time is usually about 6 to 24 hours.

Through the urethane reaction discussed above, a precursor of a cyclic ketal (meth)acrylate compound having a urethane bond represented by the formula (4) may be obtained. By subjecting this precursor of a cyclic ketal (meth)acrylate compound having a urethane bond represented by the formula (4) to hydrolytic ring-opening reaction in a water-containing solvent in the presence of a catalyst, the compound (U) may be obtained.

Examples of the catalyst used in the hydrolytic ring-opening reaction may include inorganic acids, such as hydrochloric, sulfuric, and phosphoric acid; and organic acids, such as p-toluenesulfonic acid, with hydrochloric acid being particularly preferred for its easiness of removal after the reaction. Usually, the amount of the catalyst to be used may preferably be 0.1 to 10.0 mass % of the overall reaction system.

Examples of the water-containing solvent used in the hydrolytic ring-opening may include water alone, or a mixed solvent of water and a water-soluble solvent, such as methanol, ethanol, isopropanol, tetrahydrofuran (THF), acetonitrile, acetone, methyl ethyl ketone, dimethylformamide, dimethylsulfoxide, and dimethylacetamide. A methanol/water mixed solvent is the most preferred for its easiness of removal after the reaction.

The temperature for the hydrolytic ring-opening is preferably in the range of 0 to 50° C. If the temperature is higher than 50° C., side reactions, such as hydrolysis of ester or ester exchange reaction, may occur. If the temperature is lower than 0° C., the moisture may disadvantageously be solidified. The reaction time may vary depending on the reaction temperature, the kind and amount of the catalyst, and may preferably be about 1 to 6 hours.

With the progress of hydrolytic ring-opening, a carbonyl compound may be generated in the reaction system as a by-product. Such a by-product carbonyl compound is preferably removed from the reaction system by means of vacuum distillation or the like in order to shorten the reaction time.

The monomer component (a1) in the composition of the present invention may be the compound (U) alone, or may optionally contain other monomers that are copolymerizable with the compound (U).

Such other monomers may be, for example, at least one of (meth)acrylate monomers, vinyl monomers, vinyl ether monomers, epoxy group-containing monomers, polyfunctional monomers, and cross-linking monomers.

Examples of the (meth)acrylate monomers may include methyl(meth)acrylate, glycidyl(meth)acrylate, dimethylaminoethyl(meth)acrylate, 2-hydroxyethyl (meth)acrylate, 2-methoxyethyl(meth)acrylate, 3-methacryloyloxypropyl trimethoxylsilane, pentachlorophenyl(meth)acrylate, α-naphthyl (meth)acrylate, pentabromophenyl(meth)acrylate, 2-methyl-2-adamantyl(meth)acrylate, 2-(perfluorohexyl)ethyl(meth)acrylate, and 1H-1-(trifluoromethyl)trifluoroethyl acrylate.

Examples of the vinyl monomers may include styrene, 2-chlorostyrene, β-bromostyrene, vinylcarbazole, and perfluorohexyl ethylene.

Examples of the vinyl ether monomers may include methyl vinyl ether.

Examples of the epoxy group-containing monomers may include glycidyl(meth)acrylate and 3,4-epoxycyclohexylmethyl(meth)acrylate.

Examples of the polyfunctional monomers may include ethyleneglycol di(meth)acrylate, trimethylolpropane tri (meth)acrylate, pentaerythritol tetra(meth)acrylate, and bisphenol ethanol fluorenediacrylate.

Examples of the cross-linking monomers may include N-methylol acrylamide and 4-hydroxybutyl acrylate glycidyl ether.

As discussed above, the monomer component (1a) may contain any combination of the other monomers that are copolymerizable with the compound (U). For example, in view of the adhesion to glass, the strength of the resulting film, and the affinity with the inorganic component (B), use of 3-methacryloyloxypropyl trimethoxylsilane and/or trimethylolpropane triacrylate may be preferred.

The content of the compound (U) in the composition of the present invention is arbitrary, and may suitably be selected depending on the kind and amount of the other monomers other than the cross-linking monomers. For the best film forming property in application on a substrate, the content of the compound (U) may usually be not less than 1 mass %, preferably not less than 10 mass %, more preferably 10 to 80 mass % of the total amount of the monomer component (a1) as the organic component (A) and the inorganic component (B) to be discussed later. At less than 1 mass %, sufficient adhesion may not be achieved depending on the material of the substrate.

When the monomer component (a1) contains the other monomers, the content of the other monomers other than the cross-linking monomer may usually be not more than 60 mass %, preferably 10 to 40 mass % of the total amount of the monomer component (a1) as the organic component (A) and the inorganic component (B) to be discussed later.

The content of the cross-linking monomers, when contained in the monomer component (a1), may usually be not more than 20 mass %, preferably 5 to 10 mass % of the total amount of the monomer component (a1) as the organic component (A) and the inorganic component (B) to be discussed later.

The polymer component (a2) used as the organic component (A) in the composition of the present invention contains polymer (P) obtained by polymerization of the monomer component (a1) discussed above. Usually, the mass average molecular weight of the polymer (P) may preferably be 5000 to 1000000.

Polymerization of the monomer component (a1) for obtaining the polymer (P) may be effected, for example, using a radical polymerization initiator, such as an organic peroxide including benzoyl peroxide or t-butylperoxy neodecanoate; or an azo compound including 2,2'-azobisisobutyronitrile or 2,2'-azobisdimethylisobutyrate. Use of 2,2'-azobisdimethylisobutyrate is preferred for workability.

A preferred amount of the radical polymerization initiator may usually be 0.1 to 5.0 parts by mass based on 100 parts by mass of the monomers in the monomer component (a1). The temperature and time of the polymerization may suitably be decided depending on the kind of the radical polymerization initiator, presence/absence or the kind of the other monomers. For example, for polymerization of the monomer component (a1) composed solely of the compound (U) using 2,2'-azobisdimethylisobutyrate as the radical polymerization initiator, the temperature and time of the polymerization may preferably be 50 to 70° C. and 8 to 48 hours, respectively.

The compound (U), for its own polymerizability, polymerizes by curing with UV light, visible light, electron beams, or the like, so that a radical polymerization or photopolymerization initiator is not necessarily required for photopolymerization of the compound (U).

The photopolymerization may be effected, for example, by irradiation with 254 nm UV light or electron beam (EB) at an accelerating voltage of 150 to 300 kV. Use of a photopolymerization initiator is optional, but is preferred in view of the reaction time.

Examples of the photopolymerization initiator may include 2-hydroxy-2-methyl-1-phenyl-1-propanone and 1-hydroxy-cyclohexylphenyl ketone, with 2-hydroxy-2-methyl-1-phenyl-1-propanone being preferred for its solubility in the polymerizable materials.

A preferred amount of the photopolymerization initiator, when used, may usually be 0.1 to 5.0 parts by mass based on 100 parts by mass of the monomers in the monomer composition (a1).

The structural unit derived from the compound (U) is specifically represented by the formula (6):

(6)

The composition of the present invention contains the inorganic component (B). The inorganic component (B) may preferably be hybridized with the compound (U) or the polymer (P) in the organic component (A) by means of a chemical bond, such as a hydrogen bond, to provide durability when the composition of the present invention is cured.

The hydrogen bond may be formed, for example, between at least one group selected from the group consisting of an oxygen atom, a hydroxyl group, an amino group, and a carboxyl group, on the surface or the like of the inorganic component (B), and either of the two hydroxyl groups or >N—H or >C=O in the urethane bond of the compound (U) or the structural unit in the polymer (P) derived from the compound (U). With such a hydrogen bond, the composition of the present invention may be cured into a durable film.

Examples of the inorganic component (B) may include metal alkoxides and hydrolitic condensates thereof, inorganic fine particles, and metal fine particles.

The inorganic component (B) having on its surface at least one group selected from the group consisting of an oxygen atom, a hydroxyl group, an amino group, and a carboxyl group as discussed above, may be prepared, for example, from inorganic component (B) without such a group, such as inorganic fine particles, by means of surface treatment by a known method to easily generate the group on its surface.

The shape of the inorganic component (B) is not particularly limited to a spherical shape, and may be a layered or amorphous shape.

The particle size of the inorganic component (B) may usually be 2 nm to 100 μm, preferably 2 nm to 10 μm, more preferably 3 nm to 1 μm, as measured by dynamic light scattering method. With the size of less than 2 nm, the particles may aggregate and be hard to be dispersed uniformly. With the size of over 100 μm, the particles may sediment and be hard to be dispersed uniformly. In order to prepare a composition giving in particular transparency, the size of the inorganic component (B) may preferably be in the range of 2 nm to 10 μm.

The metal alkoxide may be, for example, a compound represented by the formula (2):

(2)

In the formula, M stands for Si, Al, Ti, Zr, Ca, Fe, V, Sn, Li, Be, B, or P. Y stands for an alkyl group having 1 to 5 carbon atoms or an acyl group having 2 to 4 carbon atoms, and specifically, a methyl, ethyl, propyl, or butyl group. Preferably, Y stands for a methyl or ethyl group for volatility after hydrolysis.

X in the formula stands for an aliphatic alkyl group having 1 to 10 carbon atoms, an aromatic alkyl group having 1 to 10 carbon atoms, an aliphatic alkyl group having 1 to 10 carbon atoms and a functional group, an aromatic alkyl group having 1 to 10 carbon atoms and a functional group, or a halogen atom. Denoted by a is the same number as the atomic valence of M, and m is an integer of 1 to a.

Examples of the aliphatic alkyl group having 1 to 10 carbon atoms as X may include methyl, ethyl, n-propyl, i-propyl, n-butyl, s-butyl, t-butyl, n-pentyl, n-hexyl, cyclohexyl, n-octyl, and n-decyl groups, with a methyl or ethyl group being preferred.

Examples of the aromatic alkyl group having 1 to 10 carbon atoms as X may include benzyl and phenyl groups, with a phenyl group being preferred.

Examples of the aliphatic alkyl group having 1 to 10 carbon atoms and a functional group as X may include C1 to C10 aliphatic alkyl groups having a functional group, such as a carboxyl, carbonyl, amino, vinyl, or epoxy group. Aliphatic alkyl groups having 2 to 6 carbon atoms and an epoxy group are preferred.

Examples of the aromatic alkyl group having 1 to 10 carbon atoms and a functional group as X may include C1 to C10 aromatic alkyl groups having a functional group, such as a carboxyl, carbonyl, amino, vinyl, or epoxy group. Aromatic alkyl groups having 2 to 6 carbon atoms and an epoxy group are preferred.

The halogen atom as X may be a chlorine or bromine atom, with a chlorine atom being preferred.

The metal alkoxide represented by the formula (2) may preferably be an alkoxide of the formula (2) wherein M is Si, in view of the availability and the burden on the environment upon use. Most preferred examples of the metal alkoxide may include tetramethoxysilane, tetraethoxysilane, vinyltrichlorosilane, vinyltrimethoxysilane, vinyltriethoxysilane, and γ-methacryl oxypropyltrimethoxysilane. One or a combination of two or more of these metal alkoxysilanes may be used.

Other examples of the metal alkoxide may include organoalkoxysilanes having an alkyl group, such as methyltrimethoxysilane, methyltriethoxysilane, methyltripropoxysilane, methyltriisopropoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, pentyltriethoxysilane, octyltriethoxysilane, decyltriethoxysilane, and 2-norbornenetriethoxysilane; organoalkoxysilanes, such as phenyltrimethoxysilane, phenyltriethoxysilane, phenyltripropoxysilane, phenyltributoxysilane, phenyltriacetoxysilane, and benzyltriethoxysilane; and organoalkoxysilanes wherein the phenyl group of these alkoxysilanes is substituted with a methyl, ethyl, n-propyl, isopropyl, or t-butyl group, or a halogen.

Examples of the metal alkoxide may further include organoalkoxysilanes, such as chloromethyl trimethoxysilane, chloromethyl triethoxysilane, γ-chloropropyl trimethoxysilane, γ-chloropropyl triethoxylsilane, 4-chlorophenyl triethoxysilane, 3,3,3-trifluoropropyl trimethoxysilane, 3,3,3-trifluoropropyl triethoxysilane, γ-aminopropyl trimethoxysilane, γ-aminopropyl triethoxysilane, 3-phenylaminopropyl trimethoxysilane, 3-cyclohexylaminopropyl trimethoxysialne, 3-(2-aminoethylaminopropyl)trimethoxysilane, 3-benzylaminopropyl trimethoxysilane, mercaptomethyl trimethoxysilane, γ-mercaptopropyl trimethoxysilane, γ-mercaptopropyl trimethoxysilane, γ-mercaptopropyl triethoxysilane, vinyltrimethoxysilane, vinyltriethoxysilane, vinyltriisopropoxysilane, allyltriethoxysilane, γ-methacryl oxypropyltrimethoxysilane, γ-methacryl oxypropyltriethoxysilane, γ-glycidoxypropyltrimethoxysilane, γ-glycidoxypropyltriethoxysilane, 2-(3,4-epoxycyclohexylethyl)trimethoxysilane, and 2-(3,4-epoxycyclohexylethyl)triethoxysilane. Particularly preferred are methyltrimethoxysilane, methyltriethoxysilane, methyltripropoxysilane, and methyltriisopropoxysilane.

One or a combination of two or more of these metal alkoxysilanes may be used. When the composition of the present invention is to be applied to a synthetic resin substrate, in particular, an acrylic resin substrate, it is preferred to use an alkoxysilane having an alkyl group and an alkoxysilane having a phenyl group together, for further improving adhesion to the substrate. Particularly preferred alkoxysilanes having an alkyl group may be methyltrimethoxysilane, methyltriethoxysilane, methyltripropoxysilane, and methyltriisopropoxysilane. Particularly preferred alkoxysilanes having a phenyl group may be phenyltrimethoxysilane and phenyltriethoxysilane. One or a combination of two or more of these metal alkoxides may be used.

The hydrolytic condensate of the metal alkoxide may be prepared by hydrolyzing the metal alkoxide in the presence of a catalyst that promotes hydrolysis.

Examples of the catalyst for promoting hydrolysis of the metal alkoxide may include inorganic acids, such as hydrochloric, sulfuric, nitric, and boric acids; organic acids, such as tartaric, maleic, acetic, citric, dodecylsuccinic, hexahydrophthalic, methyl nadic, pyromellitic, benzophenone tetracarboxylic, dichlorosuccinic, chlorendic, and p-toluenesulfonic acids and anhydrides thereof; and alkaline catalysts, such as alcoholic potassium hydroxide and alcoholic sodium hydroxide.

The amount of the catalyst may suitably be selected depending on its activity, and may usually be about 0.1 to 5.0 parts by mass based on 100 parts by mass of the metal alkoxide.

Examples of the inorganic fine particles may include layered fine particles, such as graphite, clay minerals, swelling layered silicate, montmorillonite, transition metal chalcogen compounds, zirconium phosphate, sepiolite, and synthetic fluoromica; metal oxide fine particles, such as fine particles of oxides of Mn, Co, Ni, Al, Cu, Fe, Ti, Zn, Si, Zr, Pb, Sn, Sb, Bi, Ag, Au, Pt, W, Ta, Ce, Nb, Nd, In, alnico alloys (alloy of Al, Ni, and Co), rare earth-cobalt intermetallic compounds, Fe—Ni alloys, Co—Fe alloys, or Fe—Si—Al alloys (sendust), barium oxide, and strontium oxide; fine particles of magnetic materials, such as magnetoplumbite-type composite oxides containing the above metals ($MO\cdot6Fe_2O_3$ (M=Ba, Sr, Pb)), Ni—Zn ferrites, and Nd—Fe—B ceramics; fine particles of dielectric materials, such as barium titanate, strontium titanate, calcium titanate, magnesium titanate, lead titanate, lead zirconate, and barium zirconate, and composites thereof; fine particles of luminescent materials, such as ZnS, CaS, and ZnSe; fine particles of glass materials, such as $Na_2O$—$B_2O_3$—$SiO_2$ glass and quartz; fine particles of high-strength ceramics, such as silicon oxide, silicon carbide, silicon nitride, aluminum nitride, boron nitride, boron carbide, titanium carbide, and tantalum carbide; silsesquioxane, hollow silica fine particles, $MgF_2$, clay fine particles, and apatite fine particles, but are not limited thereto.

Examples of the inorganic fine particles commercially available may include SNOWTEX series and ORGANOSILICA series (both manufactured by NISSAN CHEMICAL INDUSTRIES CO., LTD.) as $SiO_2$; NANOUSE series (manufactured by NISSAN CHEMICAL INDUSTRIES CO., LTD.) as $ZrO_2$; and ALUMIASOL series (manufactured by NISSAN CHEMICAL INDUSTRIES CO., LTD.) as $Al_2O_3$.

The metal fine particles are not particularly limited as long as they are fine particles of metals or alloys, and may be, for example, fine particles of Mn, Co, Ni, Al, Cu, Fe, Ti, Zn, Si, Zr, Pb, Sn, Sb, Bi, Ag, Au, Pt, W, Ta, Ce, Nb, Nd, In, alnico alloy (alloy of Al, Ni, and Co), rare earth-cobalt intermetallic compounds, Fe—Ni alloy, Co—Fe alloy, or Fe—Si—Al alloy (sendust).

In the composition of the present invention, the ratio of the organic component (A) to the inorganic component (B) may usually be 1:99 to 99:1, preferably 1:19 to 80:1, more preferably 1:8 to 75:1, still more preferably 1:7 to 70:1 by mass. When the content of the inorganic component (B) is low, for example, improvement in film strength or refractive index of the resulting film may not be achieved. When the content of the inorganic component (B) is high, the viscosity of the composition is too high to handle the composition conveniently. However, since the composition of the present invention contains the monomer component (a1) containing the compound (U) represented by the formula (1) or the polymer (P) in combination with the inorganic component (B), even when the content of the inorganic component (B) is as high as not lower than 35 mass %, particularly 40 to 70 mass %, more particularly 40 to 99 mass %, of the total amount of the organic component (A) and the inorganic component (B), excellent transparency of the cured hybrid is conserved, excellent adhesion is also conserved when the hybrid is in the form of a film, and the surface hardness is remarkably increased.

When the inorganic component (B) is inorganic fine particles and/or metal fine particles, the content of these fine particles may usually be not more than 99 mass %, preferably not more than 80 mass %, and more preferably 10 to 50 mass % of the total amount of the organic component (A) and the inorganic component (B) in the composition.

The composition of the present invention may optionally contain a catalyst that promotes condensation of the polymer (P) and the metal alkoxide or a hydrolytic condensate thereof, as required.

Examples of the catalyst may include inorganic acids, such as hydrochloric, sulfuric, nitric, and boric acids; organic acids, such as tartaric, acetic, maleic, succinic, dodecylsuccinic, hexahydrophthalic, methyl nadic, pyromellitic, benzophenone tetracarboxylic, dichlorosuccinic, chlorendic, and p-toluenesulfonic acids and anhydrides thereof; and alkaline catalysts, such as alcoholic potassium hydroxide and alcoholic sodium hydroxide.

The content of the catalyst for condensation, when contained, may preferably be about 0.1 to 5.0 mass % of the total amount of the composition. If the content of the catalyst is too low, the polymer (P) and silica or the like may not be composited sufficiently during the formation of a film of the inorganic-organic hybrid composition. If the content of the catalyst is too high, the resulting film may have an impaired water resistance or be colored. Depending on the components to be used or the intended properties of the film of the inorganic-organic hybrid composition, one or a mixture of two or more of these catalysts may be used. The catalyst may be added at any time without particular limitation, and may be added upon preparation of the composition, or immediately before drying and curing the composition. Further, a catalyst with low activity may be added first, and a further catalyst may be added immediately before drying and curing for promoting curing.

The composition of the present invention may optionally contain various additives as desired. Examples of the additives may include curing agents, such as aminoplast, polyisocyanate compounds, blocked polyisocyanate compounds, and acid anhydrides; viscosity adjustment agents, leveling agents, defoaming agents, organic coloring pigments, dyes, antioxidants, UV absorbing agents, stabilizers, plasticizers, waxes, UV stabilizer additives, and solvents for adjusting solubility. Further, a resin paint, such as of an epoxy, fluorocarbon, polyester, or urethane resin, may be contained. One or a suitable mixture of two or more of the additives may be used. The content of these additives may suitably be selected depending on the purpose.

The inorganic-organic hybrid film according to the present invention may be obtained by applying and curing a composition of the present invention, for example, into a film on the surface of a substrate.

The substrate is not particularly limited as long as the composition of the present invention may be applied thereon, and may preferably be a substrate made of, for example, a metal, glass, resin, ceramics, or cement material. Substrates made of glass or metal are particularly preferred since adhesion to such substrates is improved due to the presence of the urethane bond and the hydroxyl group of the compound (U) or the polymer (P) contained in the present composition.

For applying the composition of the present invention to a substrate, a solvent may be used.

Examples of the solvent may include water; alcohol solvents, such as methanol, ethanol, n-propanol, isopropanol, t-butanol, isobutanol, n-butanol, 2-methylpropanol, pentanol, and ethylene glycol; hydrocarbon solvents, such as n-hexane; ester solvents, such as methyl acetate; and mixed solvents of two or more of these. Water and/or methanol is the most preferred in view of the solubility of the compound (U) or the polymer (P).

The amount of the solvent, when used, may preferably be such that the total solid content of the present composition is usually 30 to 90 mass %, preferably 50 to 80 mass %. When the total solid content is less than 30 mass %, the strength of the resulting film may be low. When the total solid content is higher than 90 mass %, the viscosity is too high to handle the composition conveniently.

The present composition may be applied to a substrate by a conventional method without particular limitation, for example, by curtain flow coating, roll coating, spraying, airless spraying, dip coating, bar coating, spin coating, or brush coating. Upon coating, it is preferred to control the film thickness by adjusting the number of applications as required so that the cured film thickness is within the range of 30 nm to 1 mm. Alternatively, a film may be formed on the substrate by immersing method.

In the present composition, the monomer component (a1) when used as the organic component (A), may be cured by thermal polymerization or photopolymerization. For thermal polymerization, a thermal polymerization initiator may be added to the composition, whereas for photopolymerization, a photopolymerization initiator may be added to the composition. When the substrate is not suitable for heating, photopolymerization is advantageous.

Incidentally, since the monomer component (a1) contains the compound (U), which per se is photopolymerizable, the polymerization proceeds by curing with UV light, visible light, electron beams, or the like, so that the thermal polymerization initiator or the photopolymerization initiator is not necessarily required.

Examples of the thermal polymerization initiator may include organic peroxides, such as benzoyl peroxide and t-butylperoxy neodecanoate; and azo compounds, such as 2,2'-azobisisobutyronitrile and 2,2'-azobisdimethylisobutyrate. Use of 2,2'-azobisdimethylisobutyrate is preferred for workability.

A preferred amount of the thermal polymerization initiator, when used, may usually be 0.1 to 5.0 parts by mass based on 100 parts by mass of the present composition.

Examples of the photopolymerization initiator may include 2-hydroxy-2-methyl-1-phenyl-1-propanone and 1-hydroxy-cyclohexylphenyl ketone, with 2-hydroxy-2-methyl-1-phenyl-1-propanone being preferred for its solubility in the present composition.

A preferred amount of the photopolymerization initiator, when used, may usually be 0.1 to 5.0 parts by mass based on 100 parts by mass of the present composition.

The temperature and time of the thermal polymerization for curing may suitably be decided depending on the kind of the thermal polymerization initiator, presence/absence or the kind of the other monomers, and may be selected from usually 50 to 200° C., preferably 50 to 150° C. For example, for polymerizing the monomer component (a1) composed solely of the compound (U) using 2,2'-azobisdimethylisobutyrate as the thermal polymerization initiator, the temperature and time of the polymerization may preferably be 50 to 70° C. and about 8 to 48 hours, respectively.

The curing by photopolymerization may be effected, for example, by irradiation with 254 nm or 365 nm UV light or electron mean (EB) at an accelerating voltage of 150 to 300 kV. Use of the photopolymerization initiator is optional, but is preferred in view of the reaction time.

When the polymer component (a2) is used as the organic component (A), the composition of the present invention may be cured, for example by drying by heating at 50 to 200° C., preferably 90 to 150° C.

The thickness of the inorganic-organic hybrid film of the present invention after curing may be adjusted to 30 nm to 1 mm.

The composition of the present invention may be used as a hard coating material, optical material, anti-rust coating material, or conductive coating material.

In particular, when the present composition is used as an optical material, the inorganic component (B) preferably contains at least one metal element selected from the group consisting of Si, Zr, Ti, Ta, Ce, Nb, and In.

The conductive coating material may be used, for example, with a material on which a conductive film may be formed for preventing static electricity that has adverse effects on various electronic appliances, or in the fields that requires various conductive films.

The anti-rust coating material of the present invention is suitable, for example, for preventing rust on zinc-based-plated steel material. As an anti-rust coating material, the present composition preferably contains in particular the polymer component (a2) as the organic component (A), and the metal alkoxide or a hydrolytic condensate thereof, optionally combined with the inorganic fine particles and/or the metal fine particles, as the inorganic component (B).

The zinc-based-plated steel materials are not particularly limited, and may be, for example, zinc- or zinc alloy-plated steel materials, including zinc-based electroplated, hot dipped, or deposition plated steel materials, such as zinc plated steel materials, zinc-nickel plated steel materials, zinc-iron plated steel materials, zinc-chromium plated steel materials, zinc-manganese plated steel materials, zinc-aluminum plated steel materials, and zinc-magnesium plated steel materials. The plated steel materials may be subjected to optional surface treatments, such as degreasing or acid cleaning, before formation of the anti-rust film.

The anti-rust coating material of the present invention may further contain, aside from the additives listed above with respect to the present composition, acidic phosphorous compounds as an anti-rust additive.

The acidic phosphorous compounds are effective for forming a phosphate layer on the base metal surface for passivation. Examples of the phosphoric acid compounds may include phosphoric acids, such as orthophosphoric, metaphosphoric, pyrophosphoric, triphosphoric, and tetraphosphoric acids; phosphonic acids, such as amino tri(methylene phosphonic acid), 1-hydroxyethylidene-1,1-diphosphonic acid, ethylenediamine tetra(methylene phosphonic acid), and diethylenetriamine penta(methylene phosphonic acid); and metal phosphates containing Ni, Zn, Al, Mg, Co, Mn, Sn, Fe, or Zr. One or a combination of two or more of these may be used.

EXAMPLES

The present invention will now be explained in more detail with reference to Examples and Comparative Examples, but the present invention is not limited thereto.

Preparation Example 1

(R,S)-1,2-isopropylideneglycerol was prepared by the following synthesis method in accordance with M. Renoll, M. S. Newman, Org. Syn. Coll. 3, 502 (1955).

100 g of glycerine, 300 ml of acetone, 3 g of 9-toluenesulphonic acid monohydrate, and 300 ml of petroleum ether were introduced into a pear-shaped flask equipped with a calcium tube, a condenser, and a Dean-stark trap, and heated to reflux in an oil bath set at 50° C. After 12 hours, when about 23 ml of water was generated, no generation of new water was confirmed, and then the reaction mixture was cooled down to the room temperature. 3 g of sodium acetate was added, and the mixture was stirred for 30 minutes. The petroleum ether and acetone were removed in an evaporator, and the resulting crude product was vacuum distilled at the bath temperature of 70° C., the fraction temperature of 60° C., and the vacuum pressure of 5 mmHg, to thereby obtain 130.6 g of (R,S)-1,2-isopropylideneglycerol in the form of a colorless, transparent liquid at the yield of 91%. The results of $^1$H-NMR measurement are shown below:

$^1$H-NMR (CDCl$_3$); 1.3-1.5 ppm, d, CH$_3$ (6H) 1.9 ppm, s, OH (1H) 3.5-4.3 ppm, m, CH$_2$CHCH$_2$ (5H)

6.60 g of (R,S)-1,2-isopropylideneglycerol synthesized above and 1 ml of pyridine were introduced into a pear-shaped flask, 7.37 g of methacryloyloxyethyl isocyanate (manufactured by SHOWA DENKO K.K.) was measured out, and a dropping funnel and a calcium tube were attached to the flask. The methacryloyloxyethyl isocyanate was slowly added dropwise into the flask in dark at room temperature, and reacted for 7 hours in an oil bath set at 50° C. After the reaction was completed, pyridine and excess (R,S)-1,2-isopropylideneglycerol were evaporated to obtain 12.7 g of (R,S)-1,2-isopropylideneglycerol-3-methacryloyloxyethyl urethane in the form of white solid at the yield of 93%. The results of $^1$H-NMR measurement are shown below:

$^1$H-NMR (CDCl$_3$); 1.3-1.5 ppm, d, CH$_3$ (6H) 1.9 ppm, s, CH$_2$=CH(CH$_3$) (3H) 3.4-4.4 ppm, m, OCH$_2$CH$_2$NH CH$_2$CHCH$_2$ (9H) 5.1 ppm, s, NH (1H) 5.6, 6.1 ppm, s, CH$_2$=C(CH$_3$) (2H)

A magnetic stirrer was placed in a vial. 1.0 g of (R,S)-1,2-isopropylideneglycerol-3-methacryloyloxyethyl urethane synthesized above, 3.9 ml of methanol, and 100 μl of 4N hydrochloric acid were introduced into the vial, and stirred for reaction at room temperature for 30 minutes until the suspension became a transparent solution. The solution was further stirred for reaction for 60 minutes and vacuum dried to obtain 852 mg of glycerol-1-methacryloyloxyethyl urethane (abbreviated as GLYMOU hereinbelow) in the form of a colorless, viscous liquid at the yield of 99%. The results of $^1$H-NMR measurement are shown below:

$^1$H-NMR (D$_2$O); 1.8 ppm, s, CH$_2$=CH(CH$_3$) (3H) 3.3-4.2 ppm, m, OCH$_2$CH$_2$NH CH$_2$CH CH$_2$(9H) 5.6, 6.0 ppm, s, CH$_2$=C(CH$_3$) (2H)

Example 1-1

0.99 g of GLYMOU synthesized in Preparation Example 1 and 0.01 g of a commercial monomer, N-methylolacrylamide (abbreviated as NMAAm hereinbelow) were mixed to prepare a polymerizable material. 1 g of this polymerizable material, 5 ml of an ethanol/water mixed solvent (4/1 (v/v)), and azoisobutyronitrile (1 mass % of the total monomers) were measured out and placed in a test tube, and mixed homogeneously. The air in the test tube was substituted with nitrogen gas and the tube was sealed. The mixture was reacted at 70° C. for 24 hours to obtain 0.95 g of an organic polymer having a mass average molecular weight of 51000, containing a copolymer of glycerol-1-methacryloyloxyethyl urethane and N-methylolacrylamide (referred to as Polymer-1 hereinbelow).

Then, 0.4 g of Polymer-1 was measured out and dissolved in 2 g of a methanol/water mixed solvent (4/1 (v/v)) to prepare an organic polymer solution.

On the other hand, to 4.23 g of tetraethoxysilane (TEOS) were added 7.32 g of water, 6.52 mg of phosphoric acid, and 910 mg of methanol, and stirred at 40° C. for 4 hours for hydrolysis, to obtain 12.5 g of a metal alkoxide hydrolytic condensate solution.

1.2 g of the organic polymer solution and 650 mg of the metal alkoxide hydrolytic condensate solution prepared above were mixed so that the ratio of Polymer-1 to TEOS was as shown in Table 1, to prepare a solution of an inorganic-organic hybrid composition.

0.5 g of the composition solution was taken out, applied uniformly to a glass substrate by means of a film applicator (JIS K 5600, trade name: DOCTOR BLADE, manufactured by T.P GIKEN), and dried by heating at 80° C. for 5 minutes and at 150° C. for 1 hour, to obtain a transparent film of 10 μm thick. The obtained film was subjected to the following evaluations. The results are shown in Table 1. Evaluation of Film Appearance: The appearance of the film was visually observed and evaluated in accordance with the following criteria:

Best: colorless, transparent, and good gloss
Good: slightly colored and turbid
Bad: opaque and turbid Evaluation of Film Strength The hardness of the film was determined by pressing the tip of a sharpened pencil at right angles to the film at a load of 1 kgf, and dragging the pencil while keeping the load to see whether the film got scratched. For example, when the film got scratched with a 5H pencil, the film hardness was evaluated as 4H. No evaluation was made of the samples which were incapable of measurement for swelling, peeling, or the like conditions.

Evaluation of Adhesion

The film was cut crisscross with a paper cutter to form 100 squares of 1 mm×1 mm size. An adhesive tape was pressed to the film and then peeled off to count the number of the squares left. No evaluation was made of the samples which were incapable of measurement for swelling, peeling, or the like conditions.

Measurement of Refractive Index

The refractive index of the film was measured with a thin film measurement system (FILMETRICS F-20) manufactured by FILMETRICS at the wavelength of 632 nm.

Examples 1-2 to 1-6

0.79 g of GLYMOU synthesized in Preparation Example 1, 0.01 g of a commercial monomer, NMAAm, and 0.2 g of methylmethacrylate (abbreviated as MMA hereinbelow) were mixed to prepare a polymerizable material, and reacted in the same way as in Example 1-1 to obtain 0.95 g of an organic polymer having a mass average molecular weight of 48000, containing a copolymer of glycerol-1-methacryloyloxyethyl urethane, N-methylolacrylamide, and methylmethacrylate (referred to as Polymer-2 hereinbelow).

Then, 0.4 g of Polymer-2 was measured out and dissolved in 2 g of a methanol/water mixed solvent (4/1 (v/v)) to prepare an organic polymer solution.

The organic polymer solution thus prepared and the metal alkoxide hydrolytic condensate solution prepared in Example 1-1 were mixed so that the ratio of Polymer-2 to TEOS was as shown in Table 1, to prepare a solution of an inorganic-organic hybrid composition. Then, a film was formed in the same way as in Example 1-1, and subjected to the various evaluations. The results are shown in Table 1.

Example 1-7

1.2 g of the organic polymer solution and 300 mg of the metal alkoxide hydrolytic condensate solution as used in Example 1-2, and 126 mg of a 30 mass % aqueous solution of zirconium oxide fine particles (particle size 3 nm, manufactured by SUMITOMO OSAKA CEMENT CO., LTD., abbreviated as $ZrO_2$ particles hereinbelow) were mixed so that the ratio of Polymer-2, TEOS, and the $ZrO_2$ particles was as shown in Table 1, to prepare a solution of an inorganic-organic hybrid composition in the same way as in Example 1-2. Then a film was formed in the same way as in Example 1-1, and subjected to the various evaluations. The results are shown in Table 1.

Example 1-8

1.2 g of the organic polymer solution and 300 mg of the metal alkoxide hydrolytic condensate solution as used in Example 1-2, and 126 mg of a 30 mass % methanol solution of silicon oxide fine particles (4 to 50 nm in particle size, manufactured by NISSAN CHEMICAL INDUSTRIES CO., LTD., abbreviated as $SiO_2$ particles hereinbelow) were mixed so that the ratio of Polymer-2, TEOS, and the $SiO_2$ particles was as shown in Table 1, to prepare a solution of an inorganic-organic hybrid composition. Then a film was formed in the same way as in Example 1-1, and subjected to the various evaluations. The results are shown in Table 1.

Example 1-9

4.23 g of zirconium-n-propoxide (abbreviated as ZNPX hereinbelow) was mixed with 7.32 g of water, 6.52 mg of phosphoric acid, and 910 mg of methanol, and stirred at 40° C. for 4 hours for hydrolysis, to obtain 12.5 g of a metal alkoxide hydrolytic condensate solution.

1.2 g of the organic polymer solution as used in Example 1-2 and 0.65 g of the metal alkoxide hydrolytic condensate solution thus obtained were mixed so that the ratio of Polymer-2 to ZNPX was as shown in Table 1, to prepare a solution of an inorganic-organic hybrid composition. Then, a film was formed in the same way as in Example 1-1, and subjected to the various evaluations. The results are shown in Table 1.

Example 1-10

900 mg of GLYMOU synthesized in Preparation Example 1 and 100 mg of a commercial monomer, 3-methacryloyloxypropyl trimethoxylsilane (abbreviated as MOPS hereinbelow) were mixed to prepare a polymerizable material. 1000 mg of this polymerizable material, 5 ml of an ethanol/water mixed solvent (4/1 (v/v)), and azoisobutyronitrile (1 mass % of the total monomers) were measured out and placed in a test tube, and mixed homogeneously. The air in the test tube was substituted with nitrogen gas and the tube was sealed. The mixture was reacted at 60° C. for 18 hours to obtain 0.95 g of an organic polymer having a mass average molecular weight of 62000, containing a copolymer of glycerol-1-methacryloyloxyethyl urethane and 3-methacryloyloxypropyl trimethoxylsilane (referred to as Polymer-3 hereinbelow). Then Polymer-3 was dissolved in a methanol/water mixed solvent (4/1 (v/v)) so that the ratio of Polymer-3 to TEOS was as shown in Table 1, to prepare an organic polymer solution. Using this organic polymer solution, a film was formed in the same way as in Example 1-1, and subjected to the various evaluations. The results are shown in Table 1.

Example 1-11

4.23 g of titanium-n-propoxide (abbreviated as TNPX hereinbelow) was mixed with 7.32 g of water, 6.52 mg of phosphoric acid, and 910 mg of methanol, and stirred at 40° C. for 4 hours for hydrolysis, to obtain 12.5 g of a metal alkoxide hydrolytic condensate solution. 1.2 g of the organic polymer solution as used in Example 1-2 and 1.16 g of the metal alkoxide hydrolytic condensate solution thus obtained were mixed so that the ratio of Polymer-2 to TNPX was as shown in Table 1, to prepare a solution of an inorganic-organic hybrid composition in the same way as in Example 1-2. Then, a film was formed in the same way as in Example 1-1, and subjected to the various evaluations. The results are shown in Table 1.

Comparative Example 1-1

An organic polymer solution was prepared using Polymer-1 prepared in Example 1-1. A film was formed in the same way as in Example 1-1 with only this organic polymer solution, and subjected to the various evaluations. The results are shown in Table 1.

Comparative Example 1-2

An organic polymer solution was prepared using Polymer-2 prepared in Example 1-2. A film was formed in the same way as in Example 1-1 with only this organic polymer solution, and subjected to the various evaluations. The results are shown in Table 1.

Comparative Example 1-3

0.95 g of an organic polymer having a mass average molecular weight of 20000, containing a copolymer of glycerol-1-methacrylate and N-methylolacrylamide (referred to as Polymer-4 hereinbelow) was obtained in the same way as in Example 1-1, except that GLYMOU was replaced with glycerol-1-methacrylate (GLM, trade name: BLEMMER GLM, manufactured by NOF CORPORATION) in preparing the polymerizable material.

Then, 0.4 g of Polymer-4 was measured out and dissolved in 2 g of a methanol/water mixed solvent (4/1 (v/v)) to prepare an organic polymer solution. A film was formed in the same way as in Example 1-1 with only this organic polymer solution, and subjected to the various evaluations. The results are shown in Table 1.

Comparative Example 1-4

1.2 g of the organic polymer solution as used in Comparative Example 1-3 and 650 mg of the metal alkoxide hydrolytic condensate solution prepared in Example 1-1 were mixed so that the ratio of Polymer-4 prepared in Comparative Example 1-3 to TEOS was as shown in Table 1, to prepare a solution of an inorganic-organic hybrid composition. Then, a film was formed with this solution in the same way as in Example 1-1, and subjected to the various evaluations. The results are shown in Table 1.

Comparative Example 1-5

0.95 g of an organic polymer having a mass average molecular weight of 50000, containing a copolymer of 2-hydroxyethylmethacrylate and N-methylolacrylamide (referred to as Polymer-5 hereinbelow) was obtained in the same way as in Example 1-1, except that GLYMOU was replaced with 2-hydroxyethylmethacrylate (HEMA, manufactured by WAKO PURE CHEMICAL INDUSTRIES, LTD.). 0.4 g of Polymer-5 was measured out and dissolved in 2 g of a methanol/water mixed solvent (4/1 (v/v)) to prepare an organic polymer solution. A film was formed in the same way as in Example 1-1 with only this organic polymer solution, and subjected to the various evaluations. The results are shown in Table 1.

Comparative Example 1-6

1.2 g of the organic polymer solution as used in Comparative Example 1-5 and 650 mg of the metal alkoxide hydrolytic condensate solution prepared in Example 1-1 were mixed so that the ratio of Polymer-5 prepared in Comparative Example 1-5 to TEOS was as shown in Table 1, to prepare a solution of an inorganic-organic hybrid composition. Then, a film was formed with this solution in the same way as in Example 1-1, and subjected to the various evaluations. The results are shown in Table 1.

TABLE 1

| | | Example | | | | | | | |
|---|---|---|---|---|---|---|---|---|---|
| | | 1-1 | 1-2 | 1-3 | 1-4 | 1-5 | 1-6 | 1-7 | 1-8 |
| Composition parts by mass | Polymer-1 | 48 | — | — | — | — | — | — | — |
| | Polymer-2 | — | 90 | 80 | 70 | 60 | 48 | 59 | 59 |
| | Polymer-3 | — | — | — | — | — | — | — | — |
| | Polymer-4 | — | — | — | — | — | — | — | — |
| | Polymer-5 | — | — | — | — | — | — | — | — |
| | TEOS | 52 | 10 | 20 | 30 | 40 | 52 | 30 | 30 |
| | ZNPX | — | — | — | — | — | — | — | — |
| | TNPX | — | — | — | — | — | — | — | — |
| | $ZrO_2$ Particles | — | — | — | — | — | — | 11 | — |
| | $SiO_2$ Particles | — | — | — | — | — | — | — | 11 |
| Evaluation | Film Appearance | Best | Best | Best | Best | Best | Best | Best | Good |
| | Adhesion | 100/100 | 100/100 | 100/100 | 100/100 | 100/100 | 100/100 | 100/100 | 100/100 |
| | Pencil Hardness | 9H | 4H | 5H | 6H | 7H | 8H | 8H | 8H |
| | Refractive Index | 1.494 | 1.507 | 1.504 | 1.500 | 1.496 | 1.490 | 1.515 | 1.496 |

| | | Example | | | Comparative Example | | | | | |
|---|---|---|---|---|---|---|---|---|---|---|
| | | 1-9 | 1-10 | 1-11 | 1-1 | 1-2 | 1-3 | 1-4 | 1-5 | 1-6 |
| Composition parts by mass | Polymer-1 | — | — | — | 100 | — | — | — | — | — |
| | Polymer-2 | 48 | — | 38 | — | 100 | — | — | — | — |
| | Polymer-3 | — | 60 | — | — | — | — | — | — | — |
| | Polymer-4 | — | — | — | — | — | 100 | 48 | — | — |
| | Polymer-5 | — | — | — | — | — | — | — | 100 | 48 |
| | TEOS | — | 40 | — | — | — | — | 52 | — | 52 |
| | ZNPX | 52 | — | — | — | — | — | — | — | — |
| | TNPX | — | — | 62 | — | — | — | — | — | — |
| | $ZrO_2$ Particles | — | — | — | — | — | — | — | — | — |
| | $SiO_2$ Particles | — | — | — | — | — | — | — | — | — |
| Evaluation | Film Appearance | Best | Best | Best | Best | Best | Best | Bad | Best | Bad |
| | Adhesion | 100/100 | 100/100 | 100/100 | 100/100 | 100/100 | 100/100 | — | 100/100 | — |

TABLE 1-continued

| | | | | | | | | | |
|---|---|---|---|---|---|---|---|---|---|
| Pencil Hardness | 8H | 8H | 8H | 2H | 3H | B | — | 4B | — |
| Refractive Index | 1.613 | 1.499 | 1.742 | — | — | — | — | — | — |

Test Example

The solution of the organic-inorganic hybrid composition prepared in Example 1-6 or the film prepared in Example 1-6 was evaluated as follows:

Evaluation of Light Transmittance

Figure 1:
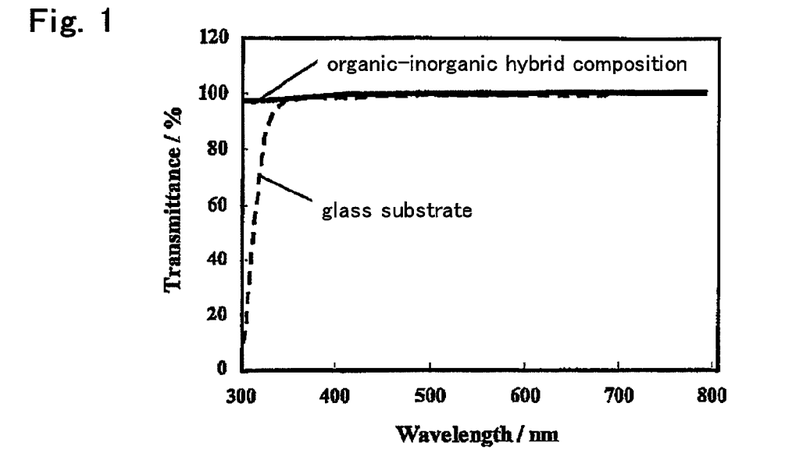
FIG. 1 is a graph showing the results of measurement of the light transmittance of the glass plate with a film formed thereon prepared in Example 1-6 over the wavelength range of 300 to 800 nm.

The light transmittance of the glass plate with the film prepared in Example 1-6 was measured in the wavelength range of 300 to 800 nm. The results are shown in FIG. 1. The light transmittance was not less than 98%.

Evaluation of Compositional Distribution of Film

Figure 2:
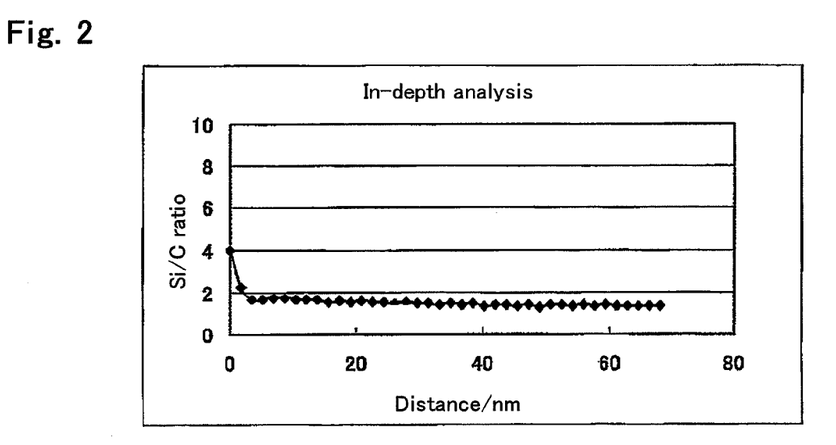
FIG. 2 is a graph showing the results of measurement by means of X-ray photoelectron spectroscopy of the elemental distribution of the film prepared in Example 1-6 in the direction of its depth.

The elemental distribution of the film prepared in Example 1-6 was measured in the direction of its depth by means of X-ray photoelectron spectroscopy. The results are shown in FIG. 2.

Impact Resistance Test and Flexibility Test

The solution of the organic-inorganic hybrid composition prepared in Example 1-6 was used to form a film of 10 μm thick on a substrate of SUS304 (70×150×0.8 mmt) in the same way as in Example 1-1, which was used as a test piece.

The impact resistance test was conducted using a Du Pont type impact tester by dropping a 500 g weight from the heights at 5 cm intervals (maximum 50 cm) on to the film of the test piece to visually observe the surface of the film for damages. It was observed that the film was not damaged even with the weight dropped from the full limits of 50 cm, showing high impact resistance.

The flexibility test was conducted by holding the test piece between cylindrical mandrels (2 to 32 mm) and bending the test piece for 180° with the film surface outside to visually observe the film for cracking and peeling. It was observed that the film was not cracked or peeled even with the mandrels of the smallest diameter of 2 mm, showing high flexibility.

Humidity Resistance Test and Thermo Cycle Test

The solution of the organic-inorganic hybrid composition prepared in Example 1-6 was used to form a film of 10 μm thick on a non-alkali glass substrate (70×70×0.7 mmt) in the same way as in Example 1-1, which was used as a test piece.

The humidity resistance test was conducted by leaving the test piece in a chamber with constant temperature and humidity of 85° C. and 85% RH for 500 hours to visually observe the film surface for cracking or peeling at 100 hour intervals. It was observed that the film was not cracked or peeled even after the lapse of 500 hours, showing high humidity resistance.

The thermo cycle test was conducted by holding the test piece at 95% RH for 10 cycles of 90° C. for 30 minutes, −40° C. for 30 minutes, and 70° C. for 30 minutes to observe the film of the test piece for cracking or peeling. It was observed that the film was not cracked or peeled even after the completion of the 10 cycles, showing high resistance to thermal cycles.

Weatherability Test and Chemical Resistance Test

The solution of the organic-inorganic hybrid composition prepared in Example 1-6 was used to form a film of 10 μm thick on a non-alkali glass substrate (70×150×0.7 mmt) in the same way as in Example 1-1, which was used as a test piece.

Figure 3:
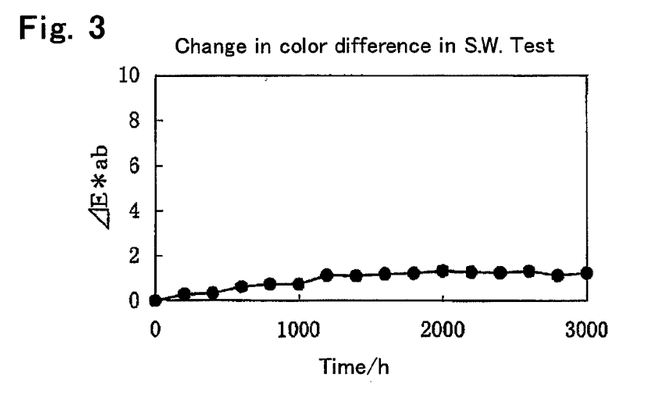
FIG. 3 is a graph showing the change in color difference (ΔE*ab) of the film prepared in Example 1-6.
Figure 4:
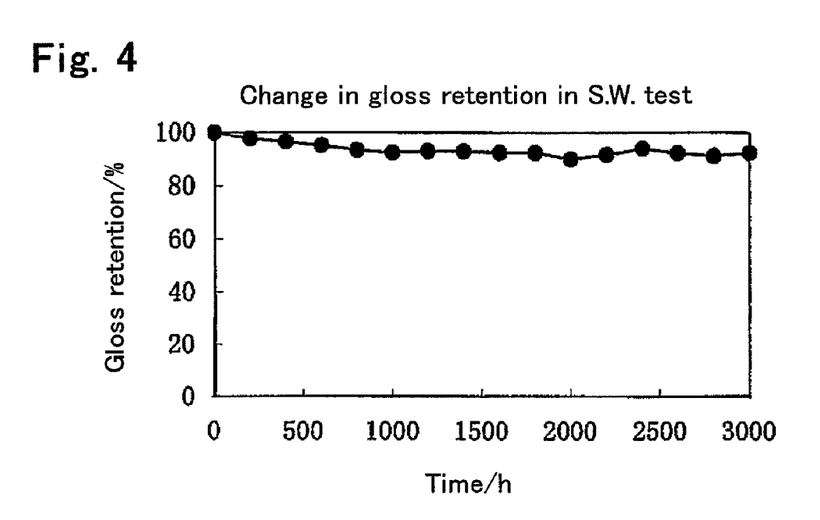
FIG. 4 is a graph showing the results of evaluation of the change in gloss retention of the film prepared in Example 1-6.

The weatherability test was performed by way of a sunshine weather test (abbreviated as S.W. test hereinbelow). The S.W. test was conducted by irradiating the film of the test piece with light of continuous spectrum in the wavelength range of 250 to 1200 nm in a thermostatic chamber at 63° C. for 102 minutes, followed by 18 minutes of light irradiation with water spraying, to observe the resulting changes in color difference (ΔE*ab) and gloss retention (%) of the film. The results are shown in FIGS. 3 and 4. ΔE*ab after the lapse of 3000 hours was 1.26, and the gloss retention was 92.3%, which showed high weatherability.

The chemical resistance test was performed by way of a xylene rubbing test. The xylene rubbing test was conducted by rubbing the film surface of the test piece with gauze impregnated with xylene at a load of 500 g for 100 reciprocating cycles to visually observe the film for cracking or peeling. It was observed that the film was not cracked or peeled even after the 100 cycles, showing high chemical resistance.

Examples 1-12 to 1-17

9.2 g of an organic polymer having a weight average molecular weight of 135000, containing a copolymer of polyglyceryl-1-methacryloyloxyethyl urethane, methylmethacrylate, and N-methylolacrylamide (referred to as Polymer-6 hereinbelow) was obtained in the same way as in Example 1-1, except that 5.0 g of GLYMOU synthesized in Preparation Example 1, 4.0 g of MMA, and 1.0 g of NMAAm were used. 2 g of Polymer-6 was measured out and dissolved in 1.8 g of an ethanol/water mixed solvent (4/1 (v/v)) to prepare an organic polymer solution.

The organic polymer solution of Polymer-6 was mixed with the metal alkoxide hydrolytic condensate solution synthesized in Example 1-1 (abbreviated as metal alkoxide (I) in Table 2), a colloidal silica dispersion (abbreviated as $SiO_2$ particle dispersion, 10 to 20 nm in particle size, 20 mass % in concentration, manufactured by NISSAN CHEMICAL INDUSTRIES CO., LTD., trade name "SNOWTEX O"), and methoxymethylated melamine (trade name "NIKALAC MW30HM", manufactured by SANWA CHEMICAL CO., LTD.) at the ratio shown in Table 2 to prepare an anti-rust coating solution.

Zinc hot-dipped steel sheets (S) of 70×150×0.8 mmt in size and zinc hot-dipped hexagon head bolts were provided as test pieces.

The steel sheet (S) was coated with the anti-rust coating solution prepared above in Examples 1-12 to 1-14 by means of a bar coater, preliminarily dried at 80° C. for 10 minutes, and heat treated at 150° C. for 30 minutes to form a film of 4 μm thick. The hexagon head bolt was immersed in the anti-rust coating solution prepared above in Examples 1-15 to 1-17 and drawn up, followed by draining of the excess solution in a centrifuge. The bolt was preliminarily dried at 80° C. for 10 minutes and heat treated at 150° C. for 30 minutes to form a film of 3 μm thick.

The film appearance, the film adhesion, the salt spray test (abbreviated as SST hereinbelow) with respect to the resulting steel sheet and the hexagon head bolt were evaluated in the following ways. The results are shown in Table 2. Incidentally, the bolt in Table 2 is the hexagon head bolt in abbreviation.

The film appearance was evaluated in the same way as in Example 1-1.

The film adhesion was determined by sticking an adhesive cellophane tape (manufactured by NICHIBAN CO., LTD., CELLOTAPE (registered trademark) No. 405) to the film, removing air bubbles by scraping the tape hard with fingers, and peeling the tape off instantaneously with one end of the tape fixed to the film. Here, the angle of the cellophane tape with respect to the film surface upon peeling was set to 45°. The adhesion was evaluated under the following criteria.
◯: The film was not peeled.
X: The film was partly or entirely peeled.

prepared in Examples 1-12 to 1-17 on the steel sheet (S) in Comparative Example 1-7 or on the hexagon head bolt in Comparative Example 1-8, and the various evaluations were made. The results are shown in Table 2.

Comparative Examples 1-9 and 1-10

A film was formed in the same way as in Examples 1-18 to 1-21 using only the metal alkoxide hydrolytic condensate solution prepared in Examples 1-18 to 1-21, on the steel sheet (S) in Comparative Example 1-9 or on the hexagon head bolt in Comparative Example 1-10, and various evaluations were made. The results are shown in Table 2.

TABLE 2

| | | Example | | | | | | | | | | Comparative Example | | | |
|---|---|---|---|---|---|---|---|---|---|---|---|---|---|---|---|
| | | 1-12 | 1-13 | 1-14 | 1-15 | 1-16 | 1-17 | 1-18 | 1-19 | 1-20 | 1-21 | 1-7 | 1-8 | 1-9 | 1-10 |
| Composition parts by mass | Polymer-6 | 50 | 50 | 44 | 50 | 50 | 44 | 30 | 35 | 30 | 35 | 100 | 100 | — | — |
| | Metal Alkoxide (I) | 50 | 40 | 55 | 50 | 40 | 55 | — | — | — | — | — | — | — | — |
| | Metal Alkoxide (II) | — | — | — | — | — | — | 70 | 55 | 70 | 55 | — | — | 100 | 100 |
| | SiO$_2$ Particle Dispersion | — | 10 | — | — | 10 | — | — | 10 | — | 10 | — | — | — | — |
| | Melamine Monomer | — | — | 1 | — | — | 1 | — | — | — | — | — | — | — | — |
| Kind of Test Piece | | Steel Sheet (S) | Steel Sheet (S) | Steel Sheet (S) | Bolt | Bolt | Bolt | Steel Sheet (S) | Steel Sheet (S) | Bolt | Bolt | Steel Sheet (S) | Bolt | Steel Sheet (S) | Bolt |
| Evaluation | Appearance | Best | Best | Best | Best | Best | Best | Best | Best | Best | Best | Best | Best | Best | Best |
| | Adhesion | ◯ | ◯ | ◯ | ◯ | ◯ | ◯ | ◯ | ◯ | ◯ | ◯ | ◯ | ◯ | X | X |
| | SST/Time | 168 | 168 | 336 | 168 | 168 | 336 | 168 | 168 | 168 | 168 | 24 | 24 | 96 | 96 |

SST was conducted in accordance with JIS Z 2371, and the evaluation was made by way of the time lapsed before generation of white rust on the film.

Examples 1-18 to 1-21

8.0 g of ethyltriethoxysilane was mixed with 8.5 g of water, 3.5 g of tetrapropoxy titanate, and 95.0 g of isopropanol, and stirred at room temperature for 4 hours for hydrolysis to obtain 115.0 g of a metal alkoxide hydrolytic condensate solution.

The organic polymer solution of Polymer-6 prepared in Examples 1-12 to 1-17 was mixed with the metal alkoxide hydrolytic condensate solution prepared above (abbreviated as metal alkoxide (II) in Table 2) and the SiO$_2$ particle dispersion at the ratio shown in Table 2 to prepare an anti-rust coating solution.

The steel sheet (S) provided in Examples 1-12 to 1-17 was coated with the anti-rust coating solution prepared above in Example 1-18 and 1-19 by means of a bar coater, preliminarily dried at 80° C. for 10 minutes, and heat treated at 150° C. for 30 minutes to form a film of 5 µm thick. The hexagon head bolt prepared in Examples 1-12 to 1-17 was immersed in the anti-rust coating solution prepared above in Examples 1-20 and 1-21 and drawn up, followed by draining of the excess solution in a centrifuge. The bolt was preliminarily dried at 80° C. for 10 minutes and heat treated at 150° C. for 30 minutes to form a film of 3 µm thick.

The film thus obtained was evaluated in the same way as in Examples 1-12 to 1-17. The results are shown in Table 2.

Comparative Examples 1-7 and 1-8

A film was formed in the same way as in Examples 1-12 to 1-17 using only the organic polymer solution of Polymer-6

From the above results, it was confirmed that organic-inorganic hybrid films excellent in properties such as flexibility, adhesion to the substrate, impact resistance, flexibility, moisture resistance, weatherability, chemical resistance, and corrosion resistance were prepared from the polymer (P) having a structural unit derived from the compound (U) represented by the formula (1) and the metal alkoxide hydrolytic condensate.

Examples 2-1 to 2-4

Inorganic-organic hybrid compositions as shown in Table 3 were prepared. 100 parts by mass of each composition was mixed with 2 parts by mass of azoisobutyronitrile, and uniformly applied to a glass substrate by means of a film applicator (JIS K 5600, trade name: DOCTOR BLADE, manufactured by T.P GIKEN). Then polymerization was effected by heating and drying at 80° C. for 30 minutes and at 150° C. for 1 hour to obtain a transparent film of 10 µm thick. The film thus obtained was evaluated in the same way as in Example 1-1. The results are shown in Table 3.

In Table 3, GLYMOU is an abbreviation for glycerol-1-methacryloyloxyethyl urethane prepared in Preparation Example 1, MMA for methylmethacrylate, GLM for glycerol-1-methacrylate, HEMA for 2-hydroxyethyl methacrylate, NMAAm for N-methylolacrylamide, and TMPT-A for trimethylolpropane triacrylate. The SiO$_2$ particles are 4 to 50 nm in size and manufactured by NISSAN CHEMICAL INDUSTRIES CO., LTD., the ZrO$_2$ particles are 3 nm in size and manufactured by SUMITOMO OSAKA CEMENT CO., LTD., and the TiO$_2$ particles are 0.26 µm in size and manufactured by SAKAI CHEMICAL INDUSTRY CO., LTD.

Examples 2-5 to 2-8

Inorganic-organic hybrid compositions as shown in Table 3 were prepared. 100 parts by mass of each composition was mixed with 5 parts by mass of 2-hydroxy-2-methylpropiophenone (registered trademark DAROCUR1173, manufactured by CIBA SPECIALTY CHEMICALS) as a photopolymerization initiator, and uniformly applied to a glass substrate by means of a film applicator (JIS K 5600, trade name: DOCTOR BLADE, manufactured by T.P GIKEN). The resulting substrate was heated at 80° C. for 5 minutes and irradiated with UV (wavelength 254 nm, amount of energy 5 J/cm$^2$) under the nitrogen atmosphere to obtain a transparent film of 10 μm thick. The film thus obtained was evaluated in the same way as in Example 2-1. The results are shown in Table 3.

Comparative Example 2-1

Without inorganic metal fine particles, 100 parts by mass of GLYMOU synthesized in Preparation Example 1 was mixed with 5 parts by mass of 2-hydroxy-2-methylpropiophenone (registered trademark DAROCUR1173, manufactured by CIBA SPECIALTY CHEMICALS) as a photopolymerization initiator, and photopolymerized under the same conditions as in Example 2-5 to form a film, which was subjected to the various evaluations. The results are shown in Table 3.

Comparative Examples 2-2 and 2-3

Inorganic-organic hybrid compositions as shown in Table 3 were prepared without GLYMOU synthesized in Preparation Example 1. Each composition was thermally cured under the same conditions as in Example 2-1 to form a film, which was subjected to the various evaluations. The results are shown in Table 3.

Comparative Example 2-4

An inorganic-organic hybrid composition as shown in Table 3 was prepared without GLYMOU synthesized in Preparation Example 1. The composition was photopolymerized under the same conditions as in Example 2-5 to form a film, which was subjected to the various evaluations. The results are shown in Table 3.

Examples 2-9 to 2-13

Organic-inorganic hybrid compositions as shown in Table 4 were prepared. 100 parts by mass of each composition was mixed with 5 parts by mass of 2-hydroxy-2-methylpropiophenone as a photopolymerization initiator, and uniformly applied to a PET film (trade name: COSMOSHINE A-4100, manufactured by TOYOBO CO., LTD.) by means of a bar coater (No. 34, manufactured by DAIICHI RIKA KABUSHIKI KAISHA). The resulting film was heated at 80° C. for 5 minutes and irradiated with UV (wavelength 254 nm, amount of energy 5 J/cm$^2$) under the nitrogen atmosphere to obtain a transparent film of 5 μm thick. The film thus obtained was evaluated in the same way as in Example 2-1. The film was also measured for the total transmittance, haze, and surface resistance (Ω/□).

The total transmittance and the haze were measured with a turbidimeter NDH2000 manufactured by NIPPON DENSHOKU INDUSTRIES CO., LTD. The surface resistance was measured with HIRESTA resistivity meter manufactured by MITSUBISHI CHEMICAL CORPORATION. The results are shown in Table 4.

In Table 4, GLYMOU refers to glycerol-1-methacryloyloxyethyl urethane prepared in Preparation Example 1, DPHA to dipentaerythritol hexaacrylate, SnO$_2$ particles to antimony-free SnO$_2$ particles manufactured by NISSAN CHEMICAL INDUSTRIES CO., LTD., ITO particles to ITO particles manufactured by SUMITOMO METAL MINING CO., LTD., and Ag particles to Ag particles manufactured by ULVAC MATERIALS, INC.

Comparative Examples 2-5 and 2-6

The compositions as shown in Table 4 without inorganic fine particles were prepared. 100 parts by mass of each composition was mixed with 5 parts by mass of 2-hydroxy-2-methylpropiophenone as a photopolymerization initiator, and subjected to photopolymerization in the same way as in Example 2-9. The various evaluations were made, and the results are shown in Table 4.

TABLE 3

| | | Example | | | | | | | | Comparative Example | | | |
|---|---|---|---|---|---|---|---|---|---|---|---|---|---|
| | | 2-1 | 2-2 | 2-3 | 2-4 | 2-5 | 2-6 | 2-7 | 2-8 | 2-1 | 2-2 | 2-3 | 2-4 |
| Composition parts by mass | GLYMOU | 30 | 50 | 40 | 35 | 40 | 40 | 40 | 30 | 100 | — | — | — |
| | MMA | — | — | — | 15 | 10 | 15 | 10 | — | — | 20 | — | — |
| | GLM | — | — | — | — | — | — | — | — | — | 30 | — | 40 |
| | HEMA | — | — | — | — | — | — | — | — | — | — | 50 | — |
| | NMAAm | — | 5 | 10 | 10 | — | — | — | — | — | 10 | 10 | — |
| | TMPT-A | — | — | — | — | 10 | 10 | 10 | 10 | — | — | — | 10 |
| | SiO$_2$ Particles | — | — | 50 | — | — | 35 | — | — | — | — | 40 | — |
| | ZrO$_2$ Particles | 70 | 45 | — | 40 | — | — | 40 | — | — | — | — | 50 |
| | TiO$_2$ Particles | — | — | — | — | 40 | — | — | 60 | — | 40 | — | — |
| Evaluation | Film Appearance | Best | Best | Best | Best | Best | Best | Best | Best | Best | Good | Best | Bad |
| | Adhesion | 100/100 | 100/100 | 100/100 | 100/100 | 100/100 | 100/100 | 100/100 | 100/100 | 100/100 | 36/100 | 53/100 | 0/100 |
| | Pencil Hardness | 8H | 8H | 8H | 8H | 9H | 8H | 9H | 8H | H | 3H | 4H | 2H |
| | Refractive Index | 1.71 | 1.603 | 1.492 | 1.385 | 1.633 | 1.495 | 1.588 | 1.787 | 1.516 | — | — | — |

TABLE 4

|  |  | Example ||||| Comparative Example ||
|---|---|---|---|---|---|---|---|---|
|  |  | 2-9 | 2-10 | 2-11 | 2-12 | 2-13 | 2-5 | 2-6 |
| Composition parts by mass | GLYMOU | 10 | 10 | 10 | 10 | 10 | 100 | — |
|  | DPHA | 50 | 40 | 30 | 30 | 30 | — | 100 |
|  | $SnO_2$ Particles | 30 | 50 | 60 | — | — | — | — |
|  | ITO Particles | — | — | — | 60 | — | — | — |
|  | Ag Particles | — | — | — | — | 60 | — | — |
| Evaluation | Film Appearance | Best | Best | Best | Best | Best | Best | Best |
|  | Adhesion | 100/100 | 100/100 | 100/100 | 100/100 | 100/100 | 100/100 | 100/100 |
|  | Pencil Hardness | 3H | 3H | 3H | 3H | 3H | B | 3H |
|  | Transmittance (%) | 98 | 98 | 97 | 90 | 90 | 99 | 99 |
|  | Haze (%) | 0.3 | 0.4 | 0.5 | 2 | 1.5 | 0.2 | 0.2 |
|  | Surface Resistivity (Ω/□) | $5 \times 10^{12}$ | $5 \times 10^{10}$ | $5 \times 10^{8}$ | $5 \times 10^{6}$ | $5 \times 10^{2}$ | $5 \times 10^{15}$ | $5 \times 10^{15}$ |

What is claimed is:

1. An inorganic-organic hybrid composition comprising: an organic component (A) consisting of:
   a monomer component (a1) containing a diol (meth)acrylate compound (U) having a urethane bond represented by the formula (1), said monomer component (a1), when polymerized, giving a polymer (P) having a structural unit represented by the formula (6), or
   a polymer component (a2) containing the polymer (P) having a structural unit represented by the formula (6), said polymer (P) being obtained by polymerization of said monomer component (a1):

(1)

(6)

wherein $R^1$ stands for a hydrogen atom or a methyl group and $R^2$ stands for —$(CH_2)_n$- with n being an integer of 1 to 4, and l denotes an integer indicating that the parenthetic expression is a repeat unit, a cross-linker monomer, and an inorganic component (B), wherein the ratio of said organic component (A) to said inorganic component (B) is 1:99 to 99:1 by mass; and wherein the polymerization is conducted in the presence of a cross-linker monomer and wherein the polymer (P) is cross-linked.

2. The composition according to claim 1, wherein said monomer component (a1) further comprises at least one of (meth)acrylate monomers, vinyl monomers, vinyl ether monomers, epoxy group-containing monomers, and polyfunctional monomers.

3. The composition according to claim 1, wherein said inorganic component (B) comprises at least one of inorganic fine particles, metal fine particles, metal alkoxides or hydrolytic condensates thereof.

4. The composition according to claim 1, wherein said inorganic component (B) is capable of forming a hydrogen bond with said compound (U) or the structural unit (6) in said polymer (P).

5. The composition according to claim 4 wherein said inorganic component capable of forming a hydrogen bond is at least one of inorganic fine particles, metal fine particles, metal alkoxides and hydrolytic condensates thereof, each having on a surface thereof at least one group selected from the group consisting of an oxo group, a hydroxyl group, an amino group, and a carboxyl group.

6. The composition according to claim 3, wherein said inorganic component (B) has a particle size of 2 nm to 10 μm.

7. The composition according to claim 3, wherein said inorganic fine particles are of a compound comprising at least one metal element selected from the group consisting of Si, Zr, Ti, Ta, Ce, Nb, In, Ag, Pt, Au, Cu, Ni, Sn, and Zn.

8. The composition according to claim 3, wherein said metal fine particles are selected from the group consisting of fine particles of metals or alloys comprising at least one metal element selected from the group consisting of Si, Zr, Ti, Ta, Ce, Nb, In, Ag, Pt, Au, Cu, Ni, Sn, and Zn.

9. The composition according to claim 3, wherein said metal alkoxide is represented by the formula (2):

$$M(OY)m(X)a-m \quad (2)$$

wherein M stands for Si, Al, Ti, Zr, Ca, Fe, V, Sn, Li, Be, B, or P; Y stands for an alkyl group having 1 to 5 carbon atoms or an acyl group having 2 to 4 carbon atoms; X stands for an aliphatic alkyl group having 1 to 10 carbon atoms, an aromatic alkyl group having 1 to 10 carbon atoms, an aliphatic alkyl group having 1 to 10 carbon atoms and a functional group, an aromatic alkyl group having 1 to 10 carbon atoms and a functional group, or a halogen atom; a denotes a same number as an atomic valence of M; and m is an integer of 1 to a.

10. An inorganic-organic hybrid film produced by curing a composition according to claim 1 into a film.

11. The hybrid film according to claim 9, wherein said film has a thickness of 30 nm to 1 mm.

12. A hard coating material consisting of a composition according to claim 1.

13. An optical material consisting of a composition according to claim 1.

14. An anti-rust coating material consisting of a composition according to claim 1.

15. A conductive coating material consisting of a composition according to claim 1.

* * * * *